(12) United States Patent
Draving et al.

(10) Patent No.: US 7,460,591 B2
(45) Date of Patent: Dec. 2, 2008

(54) METHOD AND APPARATUS USING RE-SAMPLED TIE RECORDS TO CHARACTERIZE JITTER IN A DIGITAL SIGNAL

(75) Inventors: Steven D. Draving, Colorado Springs, CO (US); Allen Montijo, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 744 days.

(21) Appl. No.: 10/929,194

(22) Filed: Aug. 30, 2004

(65) Prior Publication Data

US 2006/0045175 A1 Mar. 2, 2006

(51) Int. Cl.
*H04B 3/46* (2006.01)
*H04B 17/00* (2006.01)
*H04Q 1/20* (2006.01)

(52) U.S. Cl. ............... 375/226; 375/227; 375/224; 375/371; 702/69

(58) Field of Classification Search ............ 375/371, 375/224, 226, 227; 702/69, 71, 73, 74, 79
See application file for complete search history.

(56) References Cited

U.S. PATENT DOCUMENTS

| | | | | |
|---|---|---|---|---|
| 5,583,792 A | * | 12/1996 | Li et al. | 709/224 |
| 6,970,528 B2 | * | 11/2005 | Pearson | 375/371 |
| 7,254,168 B2 | * | 8/2007 | Guenther | 375/226 |
| 2003/0004664 A1 | * | 1/2003 | Ward et al. | 702/69 |
| 2005/0273320 A1 | * | 12/2005 | Yamaguchi et al. | 704/205 |
| 2005/0286627 A1 | * | 12/2005 | Tabatabaei | 375/238 |

OTHER PUBLICATIONS

AN 1432, Jitter Analysis Techniques for High Data Rates, Feb. 3, 2003, 5988-8425EN.
AN 1448-1, Measuring Jitter in Digital Systems, Jun. 1, 2003, 5988-9109EN.
AN 1448-2, Finding Sources of Jitter with Real-Time Jitter Analysis, Jun. 30, 2003, 5988-9740EN.
PN 86100C-1, Precision Jitter Analysis Using the Agilent 86100C DCA-J, Jun. 16, 2004, 5989-1146EN.

* cited by examiner

*Primary Examiner*—Phuong Phu

(57) ABSTRACT

Measurement of jitter in a system uses a digital test sequence including many repetitions of a test pattern. An Acquisition Record is made of the entire test sequence. A complete Time Interval Error (TIE) Record is made of the Acquisition Record. The complete TIE Record is separated into a collection of Component TIE Records, one for each transition in the test pattern, and that collectively contain all the different instances in the test sequence of that transition in the test pattern. An FFT is performed on each component TIE Record, and the component FFTs are processed to obtain timing jitter data for the digital signal.

15 Claims, 11 Drawing Sheets

METHOD AND APPARATUS USING RE-SAMPLED TIE RECORDS TO CHARACTERIZE JITTER IN A DIGITAL SIGNAL

REFERENCE TO RELATED PATENT DOCUMENTS

The subject matter of this Patent Application is related to that of U.S. patent application Ser. No. 10/354,598 entitled CHARACTERIZING JITTER OF REPETITIVE PATTERNS filed 29 Jan. 2003 by Roger Lee Jungerman and assigned to Agilent Technologies, Inc. For the sake of brevity CHARACTERIZING JITTER OF REPETITIVE PATTERNS is hereby incorporated herein by reference. The subject matter of this Patent Application is also related to that of U.S. patent application Ser. No. 10/685, 027 entitled METHOD AND APPARATUS FOR DECOMPOSING SIGNAL JITTER USING MULTIPLE ACQUISITIONS filed 14 Aug. 2003 by Steven D. Draving and assigned to Agilent Technologies, Inc. For the sake of brevity METHOD AND APPARATUS FOR DECOMPOSING SIGNAL JITTER USING MULTIPLE ACQUISITIONS is also hereby incorporated herein by reference.

REFERENCE TO RELATED TECHNICAL LITERATURE

The measurement and characterization of jitter in high speed systems has become an area of interest for several vendors of electronic test equipment. There is not universal agreement concerning terms and their definitions, and there are assorted measurement strategies championed by the different vendors. This makes a concise reference to prior art techniques difficult or impossible, and almost guarantees that initial forays into the matter will be confusing, at least at first. Agilent Technologies has made a significant number of high performance products that deal with the measurement and analysis of jitter, and has published a number of documents that educate interested persons about the nature of jitter, as well as about the various measurement strategies and capabilities of related Agilent products. The instant Application arises from ongoing work on jitter measurement and analysis at Agilent, and it is not therefor surprising that the terminology and some parts of the measurement strategy are similar to what Agilent has done before, and which is described in various degree by the aforementioned published documents.

As much as we would like to, Patent Office rules of practice do not allow us to include those published documents in this Specification through incorporation by reference. Since reproduction of their text herein is not truly essential (for our purposes here that stuff is all background information, although it is very useful background information), we shall content ourselves with describing how to get copies. (They are not books for sale in the usual sense, but are more properly described as product literature.)

In times past these items of product literature were actual printed documents with permanent (Agilent) part numbers, and would have found their way onto the shelves of various libraries, and the public could find them that way, even if they were no longer provided by Agilent. Today's product literature, while often immediately available as a download after a few mouse clicks, is not necessarily available after sales of the product have ended, or, might be changed or replaced at the whim of a functionary in a marketing department.

There are four such published documents that we wish to bring to the reader's attention, and while we give the current manner of obtaining them from Agilent's web site, we also realize that it is unwise to count on that arrangement to continue indefinitely. Accordingly, we also state herein that copies of the four published documents listed below were provided in an Information Disclosure Statement filed at the time this Application was filed, and that if worst comes to worst, an interested reader ought to be able to get them by inspection of the File History of this Application.

These four published document are:

| | |
|---|---|
| AN 1432 | Jitter Analysis Techniques for High Data Rates, 3 Feb. 2003, 5988-8425EN |
| AN 1448-1 | Measuring Jitter in Digital Systems, 1 Jun. 2003, 5988-9109EN |
| AN 1448-2 | Finding Sources of Jitter with Real-Time Jitter Analysis, 30 Jun. 2003, 5988-9740EN |
| PN 86100C-1 | Precision jitter analysis using the Agilent 86100C DCA-J, 16 Jun. 2004, 5989-1146EN |

In the above nomenclature, 'AN' stands for Application Note, and 'PN' for Product Note. As this is written, the URL for the web site that can furnish copies of these documents is, broadly speaking, www.agilent.com. Web sites change over time, so some creativity may be required to navigate the site and get the search mechanism to locate the desired item. At present, the formula for direct access is:

http://cp.literature.agilent.com/litweb/pdf/<xxx.pdf>
where <xxx.pdf> is replaced by <part number.pdf> (and sans the < and >, of course).

For example, the Product Note for the Agilent 86100C DCA-J would be reached as follows:

http ://cp.literature.agilent.com/litweb/pdf/5989-1146EN.pdf

All four of these documents are of interest, informative, and useful, but if only one could be selected, PN 86100C-1 would probably be the best choice.

BACKGROUND OF THE INVENTION

High speed digital systems, whether for computational or communications purposes, rely on the ability to correctly ascertain the logical value of a data signal at specific times. A series of such consecutive logical values will represent either data or control information, and if satisfactory system performance is to be achieved the error rate in ascertaining the logical values may need to be very low, often only one error in $10^{12}$ bits, or even less.

The data signal that is of interest in such a system is generally a binary one, in that while it manifests itself as an analog property (e.g., a voltage causing an associated current), it is described as having only two valid states: logical TRUE, and logical FALSE. These are sometimes also called 'high' and 'low,' respectively, although these terms suggest their analog implementation, which can vary from one instance to the next. In any event, there are abrupt transitions between the logical values, and the minimum period of time that the data signal can represent a particular logical value is called the UI (for Unit Interval). Generally there is provided (or derived) another signal, called a clock signal, whose period is also the UI and whose abrupt transitions in a selected direction serve as the 'specific times' (mentioned above) at which the logical value of the data signal is to be ascertained, a process often termed 'sampling.'

In an ideal world, no transitions in the data signal would occur except at locations along a time axis that were an exact UI apart, or at exact multiples of the unit interval. Likewise, the transitions in the clock signal would always occur at locations along the time axis that describe exactly a series of consecutive unit intervals. It is common for the phase of the clock signal to be adjusted relative to the transitions in the data signal such that the sampling according to the clock signal will occur in the middle of the unit interval of the data signal. That is, while the UI of the data signal is the same as the UI of the clock signal, they don't coincide, but are instead staggered.

By definition, the UI of a high speed digital system is "small" and arranging for edges of signals to occur exactly when they are supposed to is (pardon the pun) no small matter. The 'rattle' in the edges of a signal that is supposed to transition only at particular times (here, at the expiration of consecutive unit intervals) is called jitter. In today's high performance digital systems, the presence of jitter in the data signal and in the clock has a significant effect on the system's ability to correctly ascertain the logical value of the data signal. There are other error causing mechanisms, to be sure, but if a high speed digital system is to offer good performance it needs to have low jitter.

In the old days the measurement of jitter could be performed by eye while observing the varying positions of an edge of a signal with an oscilloscope. Jitter was generally jitter, and so long as it was a small enough percentage of the unit interval, the issue was generally left alone. Today, however, modern systems need a more sophisticated approach. Amounts of jitter that are not easily seen in a live trace with the eye may be significant, as is an understanding of what kind of jitter is occurring. That is, to reduce jitter one generally has to locate its source, and it turns out that it is useful and productive to recognize several different types of jitter. It is now common for test equipment intended for use with high performance digital systems to include in their repertoire of operations automated measurements of jitter, and to do so while recognizing several different types of jitter, each of which can be separately characterized. Total jitter is the aggregate amount of observable jitter, and is (or ought to be) the 'sum' of all the various types of component jitter that can be recognized.

This is all well and good, but different types of test equipment (BERTs, or Bit Error Rate Testers, EDAs, or Eye Diagram Analyzers, and various types of DSOs, or Digital Sampling Oscilloscopes) each have internal architectures that favor a balance between cost and performance for accomplishing their main task. Adding an effective and accurate jitter measurement technique (and there are several) to such an apparatus must be done in a way that co-exists with whatever architecture that is already there. Sometimes the marriage is pleasing, and at other times it has left something to be desired. Sometimes the technique selected for jitter measurement does not produce results that are always accurate, or, it takes forever (hours, or even days!) to get accurate results having resolution in parts in $10^{12}$.

Suppose, for example, that one were to simply apply a brute force approach for a signal whose UI were one nanosecond. It is customary for the measurement to occur within a setting where a selected test sequence of data is sent repeatedly, say one that is repetitions of a test pattern of 127 bits. (Patterns in the data have an effect on jitter, so test patterns that are known or thought to be trouble makers are used to form the test sequence. Since we don't always know for sure ahead of time what those are, a usual way to do that is to use a PRBS—Pseudo Random Binary Sequence—of $2^n$-1 bits.) So, that's a little over a hundred nanoseconds for the test pattern. To simplify the numbers, let's just call it one hundred. Now, if you are conducting trials of independent events, and want to know how many times out of N-many trials some event condition happens, you are generally obliged to conduct N-many trials. You will not have confidence in the rate information until either the detected events begin to appear with sufficient frequency to be predictable, or, the number of trials conducted indicates that the probability of the event is below a threshold of concern. In the first case it might not be necessary to do all N-many trials if the rate of events is high. In our area of interest that would correspond to discovering very early on that "Yup, that jitter is REALLY bad . . . " But if it is low, as desired, then you might find your self waiting until all $10^{12}$ instances of the test pattern have occurred. Neglecting overhead, that's $10^{12}$ periods of one hundred nanoseconds, or $10^5$ seconds. The reader is reminded that there are only 3,600 seconds in an hour, 86,400 seconds per day, for about 1.15 days to complete the measurement. Clearly, the brute force approach is not suitable for characterizing expected low rates of jitter.

Various strategies have been developed to cope with this situation. These often revolve around assuming that some of the jitter is random in nature, with the rest arising from various other mechanisms. The idea is that, if the nature of a component source of jitter is known, then it can be represented by a model. The significance of this is that, while the model needs coefficients to produce greater or lesser amounts of jitter, the shape of the probability distribution of that jitter component is specific to the model, so that the particular coefficients for a specific instance can be found by curve fitting techniques operating on suitable samples. The plan is to sample for a reasonable amount of time, do a curve fit to instantiate the model, and then let the model predict with some confidence what we would get if we let the measurement run to conclusion using brute force techniques.

Now a new set of difficulties arises. The measured data will contain the effects of all the different types of jitter. It is not possible to readily directly measure each of the component types of jitter, since we can't observe them in isolation. Not only must indirect methods be developed, but there is more than one way to decompose into components the combined jitter that is measured.

We are particularly interested here in a jitter measurement technique that is useable in a real time DSO (or comparable environment), and that produces credible and valid results in seconds instead of hours. While there are various techniques that are known for accomplishing that, each suffers from some disadvantage. For example, one technique operates quickly, but does not preserve observed frequency information for period jitter, which is useful diagnostic information for an attempt to eliminate such jitter. As a second example, another technique does not readily allow the combining of multiple measurements to obtain a more accurate answer. Still another disadvantage of some conventional techniques is that they do not accommodate an arbitrarily long test sequence. There is a need for a jitter measurement technique using a real time DSO that operates quickly, preserves useful ancillary information, whose resolution scales with longer measurement times, and that tolerates test sequences of arbitrary length. What to do?

SUMMARY OF THE INVENTION

Measurement and analysis of jitter in a System Under Test begins with the production of a digital test sequence that comprises many repetitions of a test pattern containing a wide variety of bit values in combination. An Acquisition Record is made of the entire test sequence. A complete Time Interval Error (TIE) Record is made of the Acquisition Record. The complete TIE Record is separated into a collection of Component TIE Records, one for each transition in the test pattern, and that contains all the different instances in the test sequence of that particular transition in the test pattern. A Fourier Transform (FT) is performed on each component TIE Record, and the collected DC contributions of those FTs are combined to produce indications of Data Dependent Jitter, both as a function of bit position within the test pattern, and for the test sequence as a whole. The various spectral content of the FTs for the component TIE Records are combined to produce an indication of Random Jitter (RJ) and Periodic Jitter (PJ), which can then be used in finding Deterministic Jitter and Total Jitter. The RJ and PJ components available from the component FTs are aliased, and non aliased FTs for each can be produced from the collection of component FTs.

DESCRIPTION OF A PREFERRED EMBODIMENT

Figure 1:
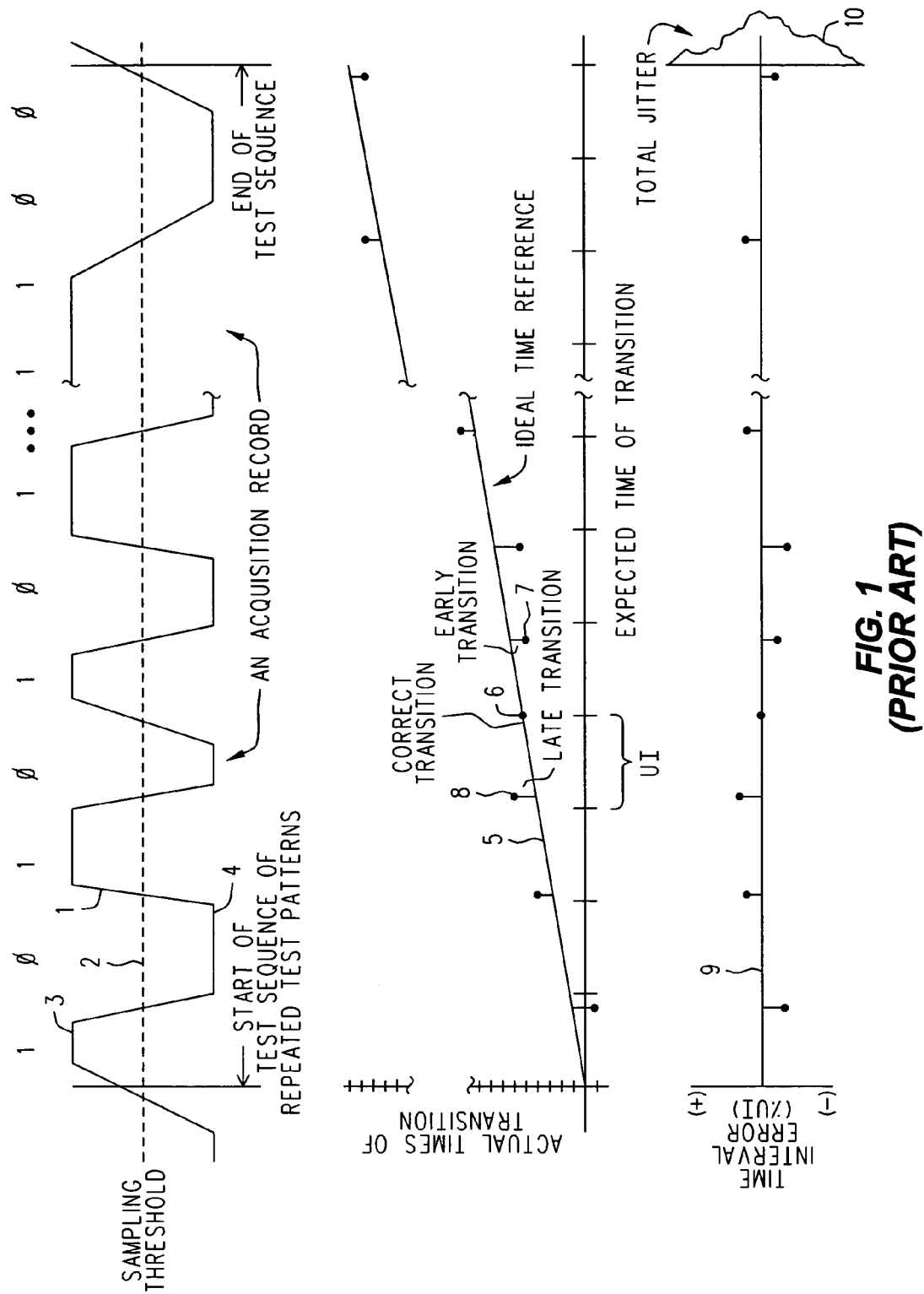
FIG. 1 is a prior art diagram illustrating the notion of a TIE Record for a Data Acquisition Record and a prior art histogram produced therefrom to estimate total jitter.

Refer now to FIG. 1, wherein is shown a simplified representation of various aspects of a prior art technique for determining total jitter, and which is found in certain conventional test equipment. Total jitter is the actual aggregate amount of jitter the system exhibits, from whatever source. It is what is directly measurable, although it generally takes way too long to do so directly for the small amounts of jitter that are at present considered reasonable.

In FIG. 1 an acquired data waveform 1 is depicted, along with a threshold 2 against which the data waveform 1 is compared for determining the logical values of TRUE and FALSE in a test sequence of consecutive test patterns. In this example, the portion 3 of data signal 1 conveys a logical value of TRUE (a logic ONE), while portion 4 conveys a logical value of FALSE (a logic ZERO). We are not in this figure indicating how the time variant waveform of the data signal 1 is measured. That can be done in different ways, depending upon the nature of the test equipment. As an example that we are interested in, a real time DSO would digitize discrete sampled locations of the waveform at known times there along. (It will be appreciated that for high speed signals there may be only ten or less samples per cycle, but that this does not present a problem, since the 'scope relies on a DSP (Digital Signal Processing) implemented reconstruction filter protected by the Nyquist limit to 'fill in the dots.') In any event, the test equipment would ultimately have in its acquisition memory a data structure called an Acquisition Record that represents the waveform of the data signal. We also are not in this figure indicating how the logical pattern in use is discovered from the reconstructed waveform according to the relationship between the waveform of the data signal 1 and the threshold 2. The pattern might, by simple agreement, be known ahead of time. Post processing by the DSO of the Acquisition Record 1 can reveal the sequence of logical values it contains, should that be desirable (which for us it will be). Another possibility, but one which probably won't be used (owing to cost and calibration issues), is coupling the input signal to an actual hardware comparator having an actual threshold that produces an actual collection of logical ONEs and ZEROs.

To continue, the Acquisition Record 1 can be processed with DSP techniques and/or interpolation to discover with suitable precision the locations along a time axis when the data signal crossed the threshold 2. With a correctly set threshold (very probably one set in the middle of the signal's voltage excursion), jitter, if it is present, will cause the time locations of the threshold crossings to vary from the ideal sequence of consecutive UIs. This is shown in the middle portion of the figure, wherein is depicted an ideal time reference line 5, appended to which are indications of correct (6), early (7) and late (8) transitions. The length of these appendages is indicative of the degree of error.

As an aside, we wish to point out that, although FIG. 1 is drawn as though each ideal UI is expected to be the same length of time, this need not be the case. There are systems where the UI varies on purpose. If we were to measure jitter in such a system we would presumably be informed about the rule for such variations, and could still correctly determine the errors that occur. We might then normalize these errors to be expressed as a percentage of expected UI, so that the members of a collection of such transition data are commensurable.

The bottom portion of FIG. 1 is a representation of a TIE (Time Interval Error) Record 9 that is prepared from the information depicted in the parts of the figure already described. The TIE Record is a description of the observed jitter, and corresponds to total jitter. One prior art technique, described in the incorporated METHOD AND APPARATUS FOR DECOMPOSING SIGNAL JITTER USING MULTIPLE ACQUISITIONS constructs a histogram (10) from the TIE data, and then uses that histogram as the basis for a model from which to make estimates of other types of jitter.

Henceforth, when we refer to a TIE Record, we shall have in mind a data structure implemented in the memory of suitable test equipment, such as a real time DSO, which contains time interval error information of the sort depicted in the lower third of FIG. 1 (although without the histogram at the right-hand end), and that has been derived from circumstances similar to those set out in the top two portions of that figure.

Figure 2:
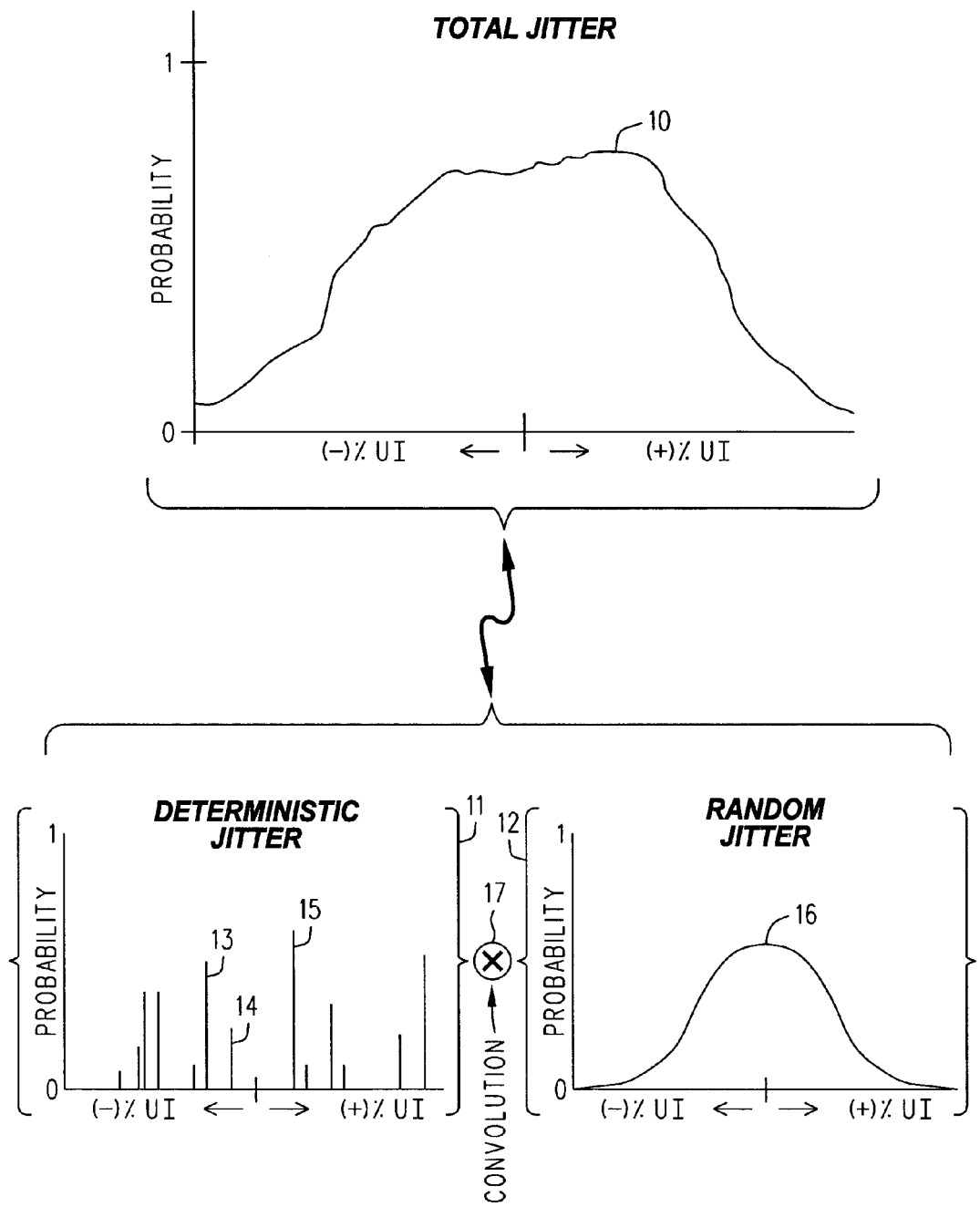
FIG. 2 is a prior art diagram illustrating that a histogram representing total jitter can be decomposed into separate probability distributions representing deterministic jitter and random jitter.

Refer now to FIG. 2, wherein is shown a histogram 10 representative of the histogram in the lower right-hand corner of FIG. 1. Histogram 10 is not one that has been directly obtained by brute force measurements, although suppose for a moment that it is. Such a histogram is indeed an item that we would like to have (even if we don't actually have it), and we are showing it (10) in the abstract and in the spirit of saying "Well, there exists some histogram that describes the total jitter, and let's suppose that this (10) is it." It is a histogram of probability versus percent error in UI. That is, the amounts of jitter, while they could be described as absolute times, are instead described as position errors that are early or late arrivals in terms of the UI. The probability axis represents the likelihood that an edge occurred with that amount of position error. Now, in this regard, it may be tempting to think that the only possible errors are fractions of a UI. For some systems this would be a reasonable assumption. But we are operating at very high speeds for data streams of significant length. A slight drift in the data rate can accumulate errors to produce a transition location having more than a UI of error, when compared to the ideal correct time of signal transition.

To continue, then, our plan is to assert that there exists some histogram 10 describing total jitter, and argue that, whatever it is, it can be decomposed into random jitter and deterministic jitter. That is, we will assume that such a decomposition is a true partition of the total jitter: i.e., any type of jitter is either in one category or the other, and that none is in both. This leads us to assert that there is some representation 11 for deterministic jitter that can be combined with a representation 12 for random jitter that "adds up to" the total jitter 10. We shall dwell more on this manner of decomposition in connection with FIG. 3, but for now we note that we expect the deterministic jitter to usually be discrete and static, as indicated by the collection of spectra-like lines 13, 14 and 15 (note we are not accusing them of being spectral components in the signal . . . just that their shapes resemble a displayed spectra). We also expect the random jitter to follow some plausible distribution found in nature, such as a Gaussian one represented by distribution 16.

Note that both representations describe probability density functions. This leads us to one other observation, which will be familiar to those who operate with probabilities. The proper method of combining, or summing, two probability density functions such as 11 and 12 is convolution, which operation is indicated by the symbol $\otimes$ (17).

Figure 3:
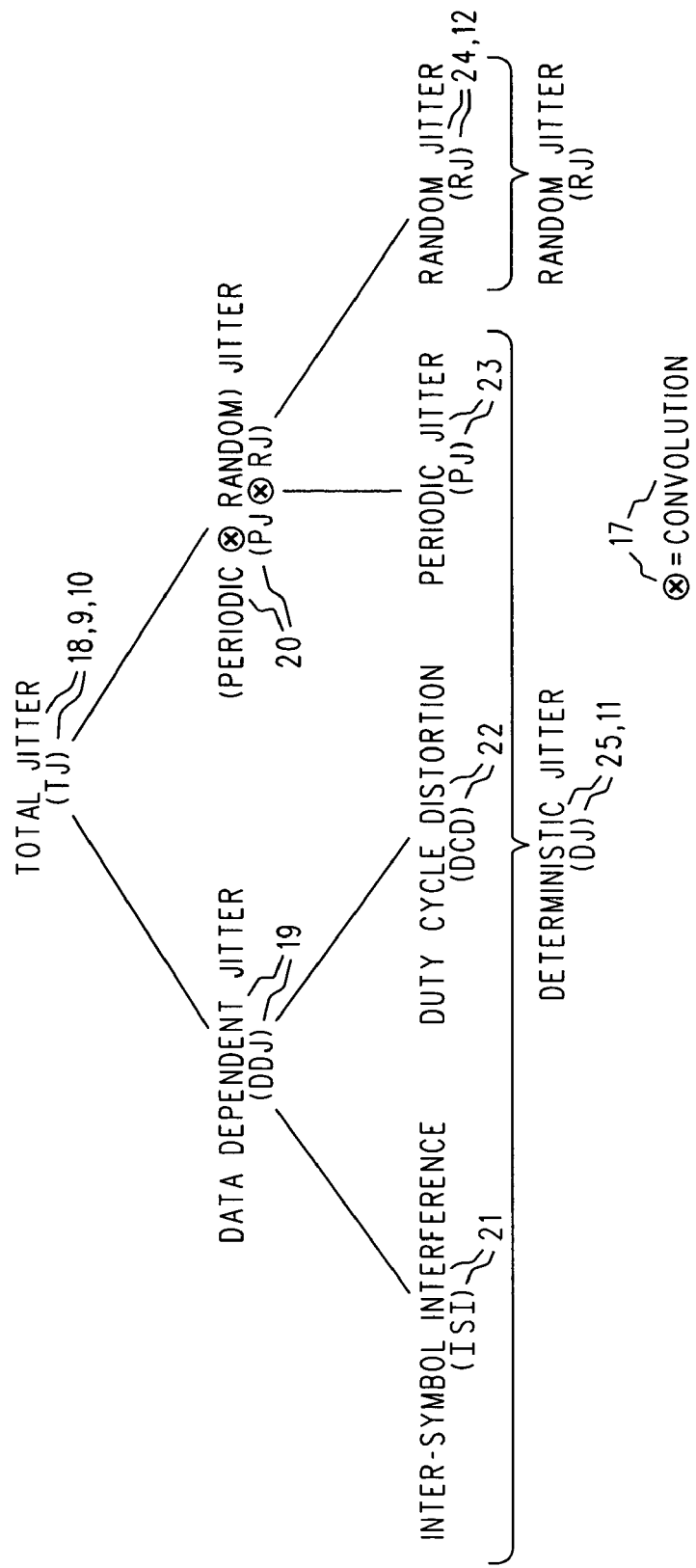
FIG. 3 is a prior art diagram illustrating a preferred manner of decomposing total jitter into deterministic jitter and random jitter.

We are now in a position to consider FIG. 3, and to give more rigorous definitions of the various types of jitter with which we shall be concerned. FIG. 3 is a diagram describing a paradigm we shall use in understanding jitter. It begins at the top with the notion that there is something called TJ 18 (Total Jitter—earlier 9, 10). It represents all the aggregate jitter that is present in the system being measured. It is the thing that, while in principle can be measured by direct observation, takes too long to discover by such a brute force method.

In the paradigm of FIG. 3, TJ 18 is composed exactly of two component parts, one of which we call DDJ 19 (Data Dependent Jitter) and the other of which is the combination (20) of PJ $\otimes$ RJ. This combination 20 is of Periodic Jitter (PJ 23) convolved with Random Jitter (RJ) 24 (earlier 12). We have already touched on the notion of RJ. It is assumed to arise for inescapable natural reasons, after the fashion of thermal noise or quantum effects, and is further assumed to be Gaussian in nature. PJ 23 is jitter that has a strong periodic content, say, for example, that a strong periodic signal from another system is coupled via cross talk into the system being measured. It might have no correlation whatsoever to the SUT (System Under Test), but is nevertheless regular. And while the presence of PJ in our paradigm allows for this sort of thing, we don't demand that it actually be there. That is, in some SUTs there might not be any detectable PJ.

The other component of TJ 18 is DDJ 19. This is jitter that is caused by, or correlated with, the particular patterns of bits in the data being transmitted. In turns out that there are mechanisms that allow what has already been sent to affect the reception of the bit currently being received. Since these phenomena are already reported in the literature, we needn't dwell on them, save to identify them. They are ISI 21 (Inter-Symbol Interference) and DCD 22 (Duty Cycle Distortion). Those seeking further information about these forms of jitter are referred to the incorporated Patent Applications and the cited product literature.

Finally, we group ISI, DCD and PJ together as DJ 25 (Deterministic Jitter—earlier 11). It will be appreciated that while the DDJ portion of DJ is separable into ISI and DCD, those components are not necessarily independent nor mutually exclusive, and they generally do not combine by convolution. In any event, the intent of this grouping is that DJ 25 is all jitter that is not truly random in nature (RJ, 24), but that is either somehow correlated with the data, or is downright periodic, which in neither case fits our intuitive notion of 'random.' An important difference between RJ and DJ is that RJ is (in principle) a PDF (Probability Density Function) having an infinite domain, while DJ has a PDF whose domain is bounded.

Figure 4:
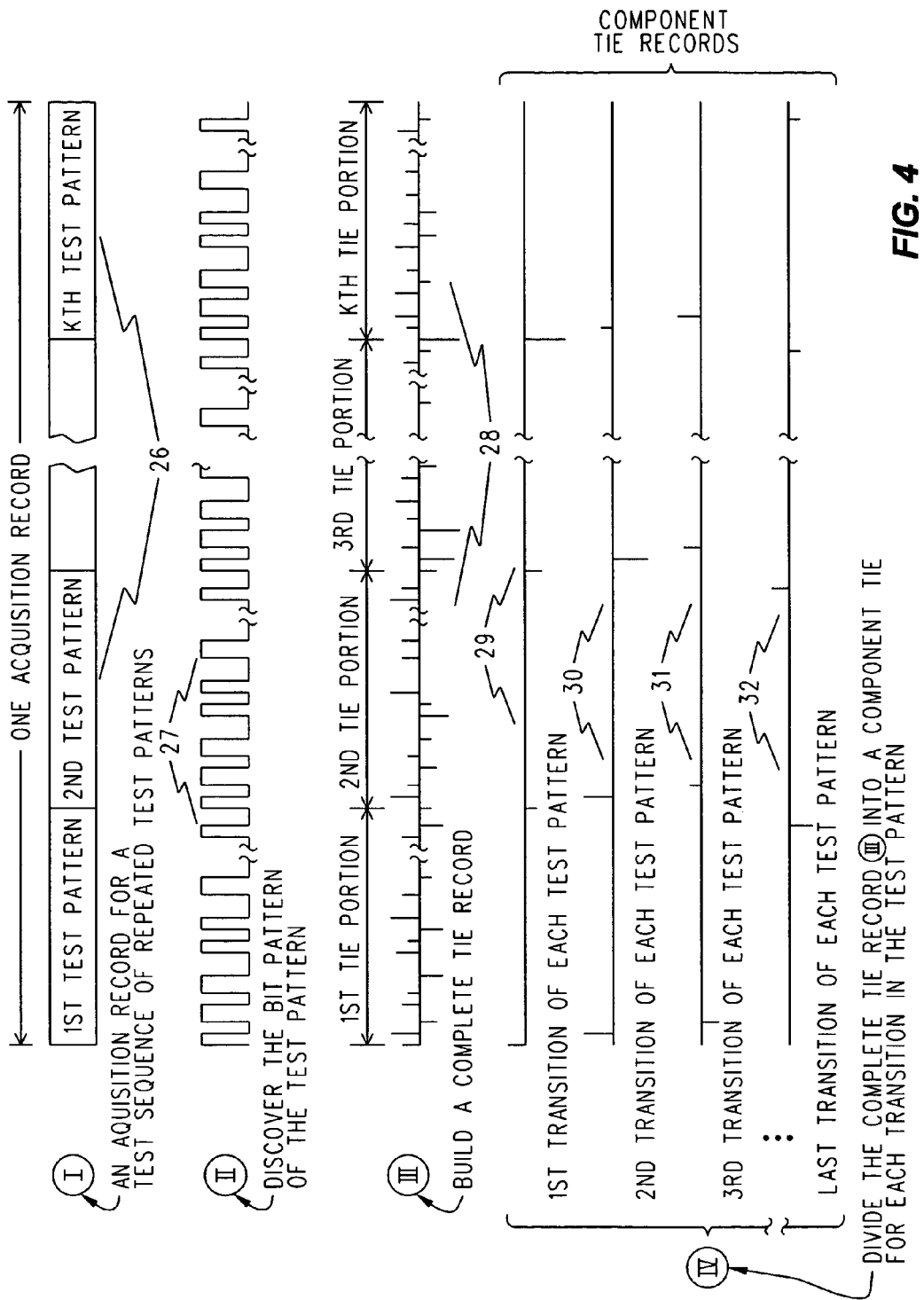
FIG. 4 is a diagram illustrating the production of a collection of component TIE Records, each for one different transition of the repeated test pattern of a test sequence, but covering the entire test sequence stored in an Acquisition Record.

Refer now to FIG. 4, where we further illustrate the technique of jitter analysis that is of interest. In part I of the figure is shown an Acquisition Record 26 that is of the same nature as the Acquisition Record 1 of FIG. 1. That is, it is the Acquisition Record of a real time DSO that has digitized a test sequence that comprises a series of K-many consecutive test patterns.

In part II of FIG. 4 we show that the logical bit pattern 27 of the test pattern has been discovered, as discussed in connection with FIG. 1.

In part III of FIG. 4 is shown a TIE Record 28 for the entire K-many test patterns in the complete Acquisition Record 26. There is one time axis that is used for the entire TIE Record 28. Here are some other things to note about the TIE Record 28 in part III. Even though the bit pattern in each of the test patterns is the same, it is most unlikely that the portions of the TIE Record 28 that correspond to them are themselves identical: they will be different because each instance of the test pattern experienced its own particular manifestation of the jitter present at that particular time. At best, they will merely resemble one another (as a loose pattern of times separating transitions), but that is favorable for our purposes, since it gives us a comprehensive description of the jitter over a longer period of time. Next, because there are occasional repeated ONEs and repeated ZEROs in the test pattern, there is not always a transition every clock cycle. This means the number of entries in the TIE Record 28 is not rigidly fixed by the length of the test pattern nor are they equally spaced apart in time according to the clock.

Some prior art techniques have performed Fast Fourier transforms (FFTs) on TIE Records for individual test patterns to obtain information about PJ and RJ. The FFT algorithm generally requires consecutive equally spaced samples. This has led some vendors to use interpolation to supply missing entries in their TIE Records. This provides inaccurate results, as it is rather like asking "What is the average of these fifty numbers?" while only supplying you with, say, thirty-seven numbers. You are forced to be creative and supply thirteen missing numbers . . . . If some existing data is used to estimate missing data, the resulting average is skewed in favor of the data used to supply the estimates. Another interpretation of such prior art techniques is that they use bandwidth dependent filtering to suppress high frequency content, which also weights the FFT results in favor of lower frequency parts of the data. Such interpolation and filtering are each instances of the same flaw: they distort the results.

To be sure, our TIE Record 28 has 'missing' entries ('holes'), and for the same reason as set out in the second paragraph above. But we can get all the available desired information about RJ and PJ without 'cheating' by looking at the problem from another direction.

In part IV of FIG. 4 a collection of re-sampled component TIE Records (29-32) is formed from inspection of the complete TIE Record 28. We form one such re-sampled component TIE Record for each transition in the test pattern, so that each of the re-sampled component TIE Records will have K-many entries (where K is the number of test patterns and J is the number of transitions in a test pattern), all corresponding to a particular transition (i.e., first, second, third, . . . $(J-1)_{th}$, $J_{th}$). Now note two things: First, none of these component TIE Records (29-32) has any holes. (It might have some entries that in terms of our illustration would be 'dots' instead of 'lines'—a 'no error' entry that is a line of zero length, or just a dot on the abscissa. Such 'dots' are not holes. And even the original TIE Record 28 can have these, along with actual holes.) There are no holes because each re-sampled component TIE Record deals with a transition that did occur—recall that a 'hole' corresponds to an absence of a transition owing to a repeated logical value. Second, if there is PJ present, then it will have left its mark on the transitions of the bits in the Acquisition Record. By forming the re-sampled component TIE Records we are looking down the time axis, as it were, of that Acquisition Record 28, but seeing only a selected transition at a time. If there is PJ present, then it will affect these bits, as well as those for another selected transition. (It has to, for if we don't find any affected transitions in the re-sampled component TIE Records, then how could there be any in the complete original TIE Record?) Now, since there are no holes, the FFT we do on a re-sampled component TIE Record is not contaminated by wishful guesswork. The price we pay is that to find the PJ ⓧ RJ jitter spectrum we will need to combine the FFTs done for each of the re-sampled component TE Records, so that all of the discovered 'component PJs' are re-assembled back into one quantity that corresponds to the entire Acquisition Record. That is, PJ may not have affected each of the individual instances of the test patterns and their successive transitions in the same way: it is 'spread out' across all the transitions that occurred. But that is one of the measurements we are out to find, and we do it for exactly those transitions that did occur, we just don't take those transitions in their actual natural order when mixed all together. We instead segregate them according to their position in the test pattern, and then combine the measurements for the segregated collections to represent the totality of the test patterns (i.e., the complete test sequence, or the real time DSO's Acquisition Record).

Figure 5:
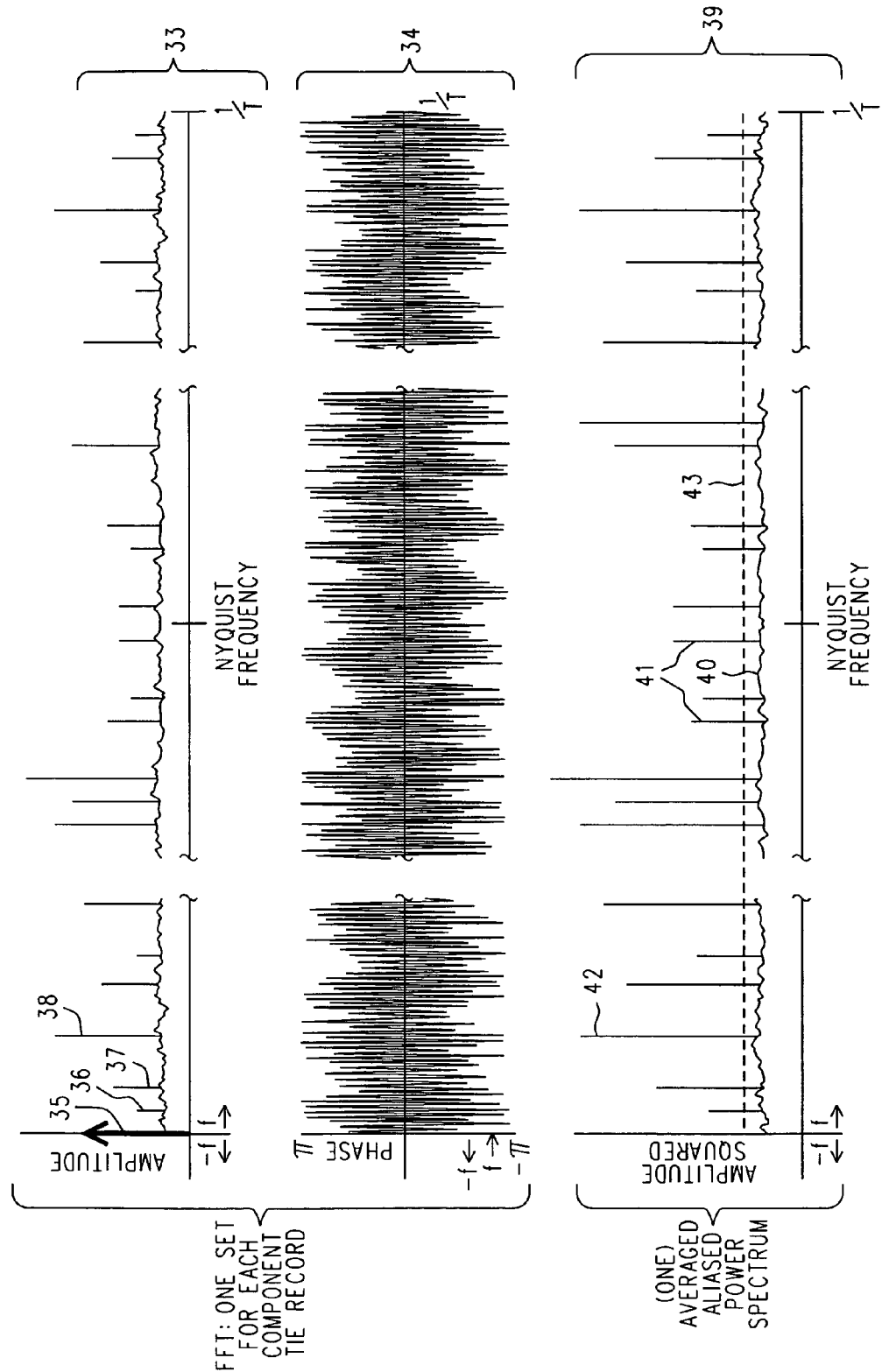
FIG. 5 is a diagram illustrating the results of doing an FFT on each of the component TIE Records of FIG. 4, and forming therefrom an average power spectrum.

Refer now to FIG. 5, wherein is depicted additional information about the processing of the individual component TIE Records (29-32). In particular, we perform an FFT (Fast Fourier Transform) on each of the component TIE Records. The result of each FFT is a spectral amplitude response diagram 33 describing amplitude versus frequency and a graph 34 of the phase of each line in the spectrum of response diagram 33. The FFT itself has been a conventional tool for some time now, and it is not necessary to know how it works or how to do one. That said, there are still some useful remarks concerning implementation that are appropriate for this discussion.

First, there is a conventional technique known as "zero padding" that adds dummy zero samples to those taken, if they are not already an integer power of two in number. This has two well known beneficial results. The first is it allows a DFT (Discrete Fourier Transform) to be replaced by an FFT, which runs much faster. The second is that it provides increased frequency resolution. (There are more points in the transform, and although only more real data will result in more accuracy, the extra points are akin to interpolation performed within the transform.) A preferred embodiment uses zero padding where appropriate.

Next, the FFT is a discrete technique that frequently does not return results that are identical to those from its more complicated (and mathematically rigorous) origin, the continuous Fourier Transform. So, for example, if a stable sinusoid were sampled by the FFT at intervals that were an exact aliquot portion of the sinusoid's period, a single line in the spectrum would be produced, and it would exactly represent that sinusoid. The same result would be produced with the continuous Fourier Transform. However, if the samples for the FFT were not an aliquot portion of the period, then the FFT would produce a collection of lines at about the frequency of the sinusoid. This phenomenon is well known, and is termed "leakage." In contrast, the continuous Fourier Transform would continue to produce a correctly placed single line, even if the frequency of the sinusoid changed by an amount corresponding to the non-aliquot FFT case. One view of this situation is that a slight change in the measurement conditions can produce a seemingly out of proportion change in the character of the returned results. There is nothing actually 'wrong' here, but it is not necessarily convenient to have to deal with it. The FFT community has developed a strategy called "windowing" to mitigate these changes. It is a technique for selectively weighting samples used for the FFT, and when it is used with an appropriately shaped 'window' there is far less variation owing to leakage in the transformed results. The price paid is that, even under ideal aliquot sampling conditions, a sole sinusoid will still appear as a collection of lines in the spectrum, although their position and amplitude can be predicted ahead of time. Store that thought.

Now, let's return to the case at hand, where we perform an FFT on the component TIE Records (29-32). The result is a collection of amplitude response diagrams (33), each one of which is paired with an associated phase diagram 34. There is one such pair for each component TIE Record. That is, each phase diagram 34, when taken with the corresponding amplitude response diagram 33 constitutes a 'component FFT' portion of a partitioned Fourier representation of the time domain test sequence 26 of K-many test patterns 27. For each such 33/34 pair we can make the following observation. If there is any jitter that is correlated with the data (DDJ 19), then because it happens the same way each time the test pattern is repeated, it will transform to a DC component. (35) in the frequency amplitude response diagram 33. (We ARE assuming DDJ is a function of the data, and for a component TIE Record the data is NOT changing—The TIE Record we are examining is for repeated instances of what ought to be the same circumstances!) Any variation in how DDJ occurs will either be PJ-like or RJ-like, and will appear in the non-DC portion of the amplitude response, which is a noise base with the various spectral lines (36, 37, 38) emerging therefrom. The frequency amplitude response lines emerging from the noise (RJ) are indicative of (non-correlated) PJ. Actual PJ that just so happens to occur at a frequency related to the clock IS correlated to the data and will look like DDJ.

Now, as part of the jitter analysis, we should like to suppress the DDJ contribution to the FFT results (33 & 34), leaving only that owing to PJ ⊗ RJ (20) that is present for the part of the test pattern under consideration. That is, we would like to get rid of the DC component 35 in each of the FFTs for the various component TIE Records, prior to combining the various component PJ ⊗ RJ results that remain. The brute force approach would be to simply truncate the spectrum by lopping off the DC contribution in each transform.

Ah, not so fast. Recall the thoughts about leakage. The DC contribution 35 would, in a limiting or continuous case with no windowing, be entirely self-contained. But in the discrete case of a DFT or an FFT where there is leakage, we also employ windowing. Unfortunately, it is the case (for example) that all or part of lines 36 and 37 are there not because of leakage arising from the DC contribution 35 (leakage does not happen from DC), but because of the effects of windowing on the DC component. The good news is, if we know the windowing function used (and we surely do), then we also know from the DC contribution 35 just what mischief to expect at the locations of lines 36 and 37, and we can subtract those effects out, too, at the same time we amputate the DC contribution 35. The result is a more accurate measurement of the component PJ ⊗ RJ that is attributable to this location in the test pattern (which is really multiple consecutive locations in the Acquisition Record that are a test pattern apart). Thus, a preferred embodiment will use an appropriate windowing, and the complete DC contribution in the transforms of the various component TIE Records will be more accurately removed, thus producing a more accurate component PJ ⊗ RJ (and ultimately, a more correct 'total' PJ ⊗ R 20). Henceforth, we shall call an amplitude response diagram 33 that has had its DC component removed, with or without windowing, an 'adjusted' amplitude response diagram. An adjusted amplitude response diagram taken with its associated phase diagram 34 describes an FFT that has been 'adjusted' to remove DDJ.

The spectral content of each of the adjusted amplitude response diagrams 33 is squared and then averaged to produce a graph 39 of AAPSD (Averaged Aliased Power Spectrum Density). "Averaged Aliased Power Spectrum Density" is quite a mouthful, especially since it is essentially just an adjective for the word "graph" and isn't really the noun we wish it was. So, we shall refer to it either as the AAPSD, or, as is common in the literature, as the more grammatically cooperative—but technically slightly sloppy—"Averaged Aliased Power Spectrum." It consists of a noise base line 40 and various spectral lines 41. It will be helpful to appreciate that for each instance of amplitude response diagram 33 the spectral lines therein tend to be in the same general place, although they will have slightly different amplitudes. So, for example, line 42 in AAPSD 39 is the average of the squares of the various lines 38 in the different instances of amplitude response diagrams 33. Once found, the Averaged Aliased Power Spectrum 39 may then be used, in a manner described in the cited product literature and the incorporated Patents Applications, to find $RJ_{rms}$, $PJ_{dd}$, $DJ_{dd}$ and $TJ_{pp}$. (The subscript 'rms' means "root means squared," 'dd' means "dual Dirac," and 'pp' means "peak to peak." Dual Dirac, sometimes called "double delta," refers to a type of model for low probability events that is explained in the cited product literature and the incorporated Patent Applications.) The following three paragraphs are a brief summary of one way these values can be found.

If the AAPSD 39 were comprised only of RJ, we could calculate the RMS value of RJ ($RJ_{rms}$) by taking the square root of the sum of all magnitudes for the frequency components therein. Unfortunately, the AAPSD is actually PJ ⊗ RJ, and we need to separate the two. This may be accomplished by comparing their magnitudes to a threshold 43. All frequencies of the AAPSD that have magnitudes below this threshold would be considered pure RJ, while the rest are PJ. Now we sum only those frequencies that we believe only contain RJ and then scale the result to account for the fact that we didn't use all the frequencies. This provides $RJ_{rms}$.

A dual-Dirac PJ value may then be found as the peak-to-peak value of a bimodal Probability Density Function (PDF) that when convolved with a Gaussian PDF, exhibits the same 99.8% peak-to-peak value as a histogram of the original TIE function, with the DDJ removed. Here the 99.8% peak-to-peak value is defined as the difference between the 99.9 percentile value and the 0.1 percentile value of a distribution or histogram.

$DJ_{dd}$ is found from $RJ_{rms}$ and the histogram (10) of the TIE Record in a manner analogous to the method used to determine $PJ_{dd}$ from $RJ_{rms}$ and a histogram for PJ ⊗ RJ.

Of course, when we remove the DC contribution 35 from the component FFT transform 33, we don't simply throw it away. We take note of its value, use it in the preparation of DDJ. Since we know which bit position within the test pattern that each component FFT Record is associated, we can simply construct a DDJ value versus bit position waveform by assigning the DC component of each component FFT to the appropriate bit position. The result is a graph of DDJ versus bit position, and from that we can also find $DDJ_{pp}$.

Now let's return for a moment to the paradigm of FIG. 3, and summarize it in light of the re-sampling technique of FIG. 4. The original complete TIE Record 28 of FIG. 4 contains the measured evidence for TJ 18. By forming the re-sampled component TIE Records 29-32 we partitioned that information into a form that allowed removal of the DDJ contribution 19 from component FFTs, as previously explained. The adjusted FFTs of the re-sampled Component TIE Records (i.e., sans their DDJ-related DC components 35 and after windowing) are a collective indication of PJ ⊗ RJ 20. If we thus isolate the combination PJ ⊗ RJ and we can find one of them in isolation, we can then further extract the other one from the combination. The product literature mentioned earlier describes various ways to proceed in this connection. In particular, we may find a value for $RJ_{rms}$ by separating PJ spectral lines from an apparent noise floor using a threshold (43).

However, a price we have paid for this manner of analysis arises from our original partition of the Acquisition Record 26 and its associated complete TIE Record 28 into re-sampled component TE Records 29-32. Owing to the reduction in the size of the data set for each component FFT performed on the re-sampled component TIE Records, there is a much lower Nyquist frequency associated with each of those (adjusted or not) component FFTs, compared to what would have been the case for an FFT performed on the complete TIE Record 28. Thus, there can be significant aliasing of frequency information in the component FFTs, in that non-aliased frequency content in an FFT of the original TIE Record 28 becomes aliased in the component FFTs for the re-sampled component TIE Records 29-32. This inhibits our ability to provide frequency information about PJ. Such information is very useful in tracking down its source, the better to reduce or eliminate it. So, on the one hand, it is the partitioning of original data that allowed the useful separation of DDJ from TJ to find PJ ⊗ RJ. On the other hand, because of that we now experience unwanted aliasing. Having done the partitioning, re-sampling and separation of DDJ, perhaps we can avoid the increased aliasing by "putting the adjusted pieces of the partition back together again"? It turns out that we can, and we now describe the method of doing so.

An equivalent adjusted Fourier Transform of the original TIE Record 28 may be found by combining the (component) FFTs for the re-sampled component TIE Records 29-32. We say it is 'adjusted' because it will not contain components related to DDJ. It is 'equivalent' because we get the appropriate answer in a non-standard manner.

The first step in combining the component FFTs is to extend their record length to be that which would correspond to an FFT of the original TIE Record 28. This is done simply by repeating each of the short component FFT records the requisite number of times. So, if we say that A, B, C, ... Z are the actual short component FFT records, we form AX, BX, CX, ... ZX, where AX is AAAAAA ... A, and so forth. This extension does not, by itself, remove any aliasing or otherwise change the basic information content of the records, but it does prepare them to receive changes as they are combined.

The second step is to note that what relates A to B, and B to C, etc., are one or more UI time delays corresponding to the data rate, as realized by the step-at-a-time nature of the partition. These time delays give rise to particular phase shifts for the frequency components in the various component FFTs. We then phase shift BX (and then CX, etc.) to a correct time position relative to AX by multiplication of its terms by the appropriate linear phase function, the result of which we may call $BX\theta_1$. This makes $BX\theta_1$ commensurable with AX (which we may think of as $AX\theta_0$), so we can sum them together at each frequency: $\Sigma X = AX\theta_0 + BX\theta_1$.

Now we adjust CX, and add it to $\Sigma X$: $\Sigma X = \Sigma X + CX\theta_2$. This process of accumulation continues until all of the component FFTs (A, B, C, ... Z) have been combined into $\Sigma X$, which is then the desired equivalent adjusted Fourier Transform that is free of extra aliasing.

In our notation we have indicated a 'piecemeal' accumulation. It will of course be appreciated that all of the phase adjustments could be performed first, and the results summed afterwards.

As the accumulations proceed the newly combined information acts to reduce the amplitude of aliased frequency components almost to zero, in accordance with the increased effective length of the record, and exactly as if the FFT had been computed using that longer record in the first instance. We say 'almost' because there is an issue concerning 'holes' in the data that are caused by lack of a transition in the original time domain data 1. Generally, we are concerned with a Non-Return-to-Zero (NRZ) data format that contains occasional repeated ONEs or ZEROs. Such repetitions prevent the appearance of a transition in the original TIE Record 28, and produce a 'zero contribution' at the absence of a transition. Recall also that the component TIE Records 29-32 are each for a transition in the Test Pattern that is repeated to form the entire Test Sequence. That is, in general, there are not as many component TIE Records 29-32 as there are bits in the Test Pattern that is repeated, the difference being caused by the holes.

At first glace, the presence of 'holes' in the original TIE Record is not seen as detrimental with regard to the aliasing of frequency components in a (long) FFT for that record. The reason is that ALL the data is referenced to a single time axis, and there has been no 'reduction' in the number of samples available for the FFT. While on the other hand, the re-sampling procedure described above does NOT provide any sort of TIE Record for a hole. The result is that when holes are present the aliased components do not cancel identically as the component FFTs are combined, leaving some residual aliasing that IS a function of the number of holes and of their position.

Upon further consideration, however, it will be appreciated that the two cases are really the same. That is, the operational effect of a 'zero contribution' (in the full length case) and a missing component TIE Record (in the re-sampled case) is the same. That said, it must also be remembered that we are not asserting that a Fourier Transform of the original full length TIE Record and the adjusted equivalent re-assembled component Fourier Transforms are identical; it must be remembered that we removed the DC component of each of the components while things were separated. So loosely put, the real equation is:

$$FT(\text{original TIE Record}) = \Sigma DC + \Sigma FT(\text{component TIE Records})$$

Our notation above is, while descriptive, more suggestive than mathematically rigorous. The APPENDIX gives a taste of the full disaster. The gist of it all is that an FFT is a summation of terms that are multiplied by various factors. The algebraic properties of associativity and commutivity allow various re-arrangements of the computational recipe. The usual single summation of product terms for an FFT on a long record is one recipe, and a series of summations on groups of suitably related terms is another. The 'groups of suitably related terms' are, of course, the component FFTs as 'suitably related' by phase shift. The following is a brief description of what is shown in the APPENDIX.

Eq. (1) is the traditional Fourier Transform equation, where $X_m$ is the transform of $x_n$. The time domain record is $x_n$, and it is N-many points in length. The time domain record index is n and m is the index for the frequency domain record, $X_m$. Now, instead of summing up all the product terms sequentially from 0 to N, consider collections of every $P_{th}$ point, of which there are Q-many such collections. There is an obvious ordering of these collections, as we pick every $P_{th}$ point, starting with an index one higher in value than the previous index. The result is shown in Eq. (4), which is obtained by substituting Eq's (2) and (3) into Eq. (1).

Equations (5), (6) and (7) are simple algebraic manipulation to re-arrange the terms.

Notice that Eq. (8) represents the Fourier Transform of a re-sampled time record. Now substitute $X'_m$ defined by Eq. (8) into Eq. (7) to produce Eq. (9). This establishes the equivalence between Eq. (1) and Eq. (9).

Before leaving the topics of holes and of recovering the frequency information for PJ, we should mention an additional point. Some prior art methods have used various forms of interpolation to fill-in the holes with estimated values before performing conventional DFTs on the TIE Records. This is a problem because it effectively low-pass filters those TIE Records with a data-dependent bandwidth. When the percentage of holes in the serial bit pattern becomes large, this data-dependent bandwidth becomes so low that it significantly corrupts the RJ measurement accuracy. The instant technique combines the individual component Fourier Transforms of the re-sampled TIE Records without the use of interpolation. Therefore, the resultant Fourier Transform is not low-pass filtered and RJ measurement accuracy is improved.

We close now with some observations about alternate embodiments and how the techniques described above can be extended to cooperate with different ways of taking multiple Acquisition Records 26. As a place to begin, it is clear upon reflection that the AAPSD from each of successive Acquisition Records 26 can be averaged with a previous AAPSD. The result is an improved separation of PJ from RJ and a subsequent improvement in the accuracy of RJ frequency components. Likewise, the adjusted PJ  RJ amplitude response from each successive acquisition can be averaged with the previous responses to improve PJ measurement accuracy. And, the DDJ-per-bit-position measurement improves with averaging, as do the PJ ⓧ RJ and TJ histograms. That in turn allows for improved $DJ_{dd}$ and $PJ_{dd}$ measurements.

Next, let's consider other relationships between the Acquisition Record and the Test Sequence made up of K-many Test Patterns. It will be recalled that the relationship we have been considering so far is one where the Acquisition Record is long enough to store K-many Test Patterns. It may be the case that it is desirable for the Test Pattern to be so long that there is not enough memory available to store an entire collection of K-many Test Patterns. Leaving aside the reason for the long length of the Test Pattern, the shortfall in memory might be simply an issue of economy (i.e., the memory is fast enough and there is no technical issue related to adding more of it), or, it might be the case that extraordinary measures would be required to add more memory, owing to the speed at which it is to operate. Those familiar with high-speed memory architectures that store data at rates many times faster than provided for by the vendor of the individual memory parts will appreciate that various schemes are used to increase throughput for a high speed memory assembly. For example, many banks of memory can be sequentially interleaved. So, at the outer limits of performance, it is often not simply a case of "adding more memory" to enlarge such a high performance architecture. Not only does the cost increase sharply, but other topics such as interconnect density and control become significant issues. These techniques do not scale up gracefully, and eventually a limit is reached and it is decided that a certain amount of high speed memory is what is available. Given a continued urge to use a long Test Sequence, and the absence of the option to add more memory, we ponder other alternatives.

Clearly, if we are faced with a measurement that put only one instance of a Test Pattern in the Acquisition Record, we cannot proceed in the direction we have set out above. That is, we need to acquire data from many Test Patterns to create component TIE Records of meaningful length, with one such component TIE Record for each transition in the Test Pattern. If there is only a single instance of the Test Pattern then the length of each component TIE Record is just one bit, and that will never do.

Someone is probably thinking along these lines: "Well, that's no problem, we'll just dual port the acquisition memory by putting another memory sub-system in there and switching between them such that we unload and process one while the other is being loaded . . ." We don't say that, in principle, such an approach is altogether impossible. Say, some secret government agency with unlimited finding might build one or two such systems, but our premise was that we have ALREADY reached the practical limit of memory size/speed for jitter analysis systems to be fabricated in volume and sold in commerce. What is more, it IS a problem, since there are very significant issues connected with maintaining a coherent time axis for all the measurements, and with ensuring that there is no dead time when switching from one memory port to the other. All in all, we are justified in repeating: "NO MORE MEMORY—AND DO IT WITH MEMORY TECHNIQUES THAT ARE READILY IMPLEMENTED IN HIGH SPEED COMMERCIAL TEST EQUIPMENT!"

A solution is to regularly acquire a segment of the long test sequence, process that data and then repeat that for another segment, and so on. An example is in order. Suppose the long test sequence is 4096 ($2^{12}$) bits in length, and the length of the Acquisition Memory is 1024 ($2^{10}$) bits. Let us arrange to initially trigger the measurement on the start of each instance of the long test sequence. We acquire transition time data for the first sixteen ($2^4$) bits (a first segment) of the long test sequence each time there is a trigger, and then store that data in the next locations in the Acquisition Record. After sixty-four ($2^6$) such acquisitions we have a full Acquisition Record of 1024 bits that will support forming component TIE Records for the transitions within the first sixteen bits of the long test sequence. Now process or store that data for future processing, as desired, and arrange for the trigger to occur on each instance of the second sixteen bits (a second segment) of the long test sequence. Acquire another sixty-four acquisitions, and process or store that data for later processing. In this way we can cover as much of the 4096 bits of the long test sequence as we like. It will take 256 ($2^8$) such portions to get it all, and we may decide to take only part of it, rather than take all of it. For example, we might take the sixty-four instances of only every first, third, fifth, . . . , sixteen bit segment, and so on, for a total of 128 segments (i.e., acquiring data for only half of the long test sequence). However, within the sixty-four instances of a particular sixteen-bit group, we must always take those instances in a regular fashion. So, for example, we could take every other first sixteen bits, allowing 128 of them to occur to get our sixty-four. But then we must take exactly every other one, and never two in a row, etc. The sixteen-bit segments need not be disjoint, and might even overlap each other, with the implication that there might be more than sixty-four instances. We must also use the same rule (whatever it is) for taking regular acquisitions for all of the other sixty-four (or however many) instances of the other sixteen-bit segments. If we proceed in this way we shall have (partial collections of) component TIE Records that provide (partial collections of component) FTs whose power spectrums can be averaged and used to find RJ, PJ and DDJ, all as described earlier. The only drawback to this scheme is that if we re-combine the component FTs in the manner described in the APPENDIX to produce an equivalent FT, the results are, in general, unusable due to the large number of holes in the data (it's likely that there are many times more holes than there are samples).

Figure 6A:
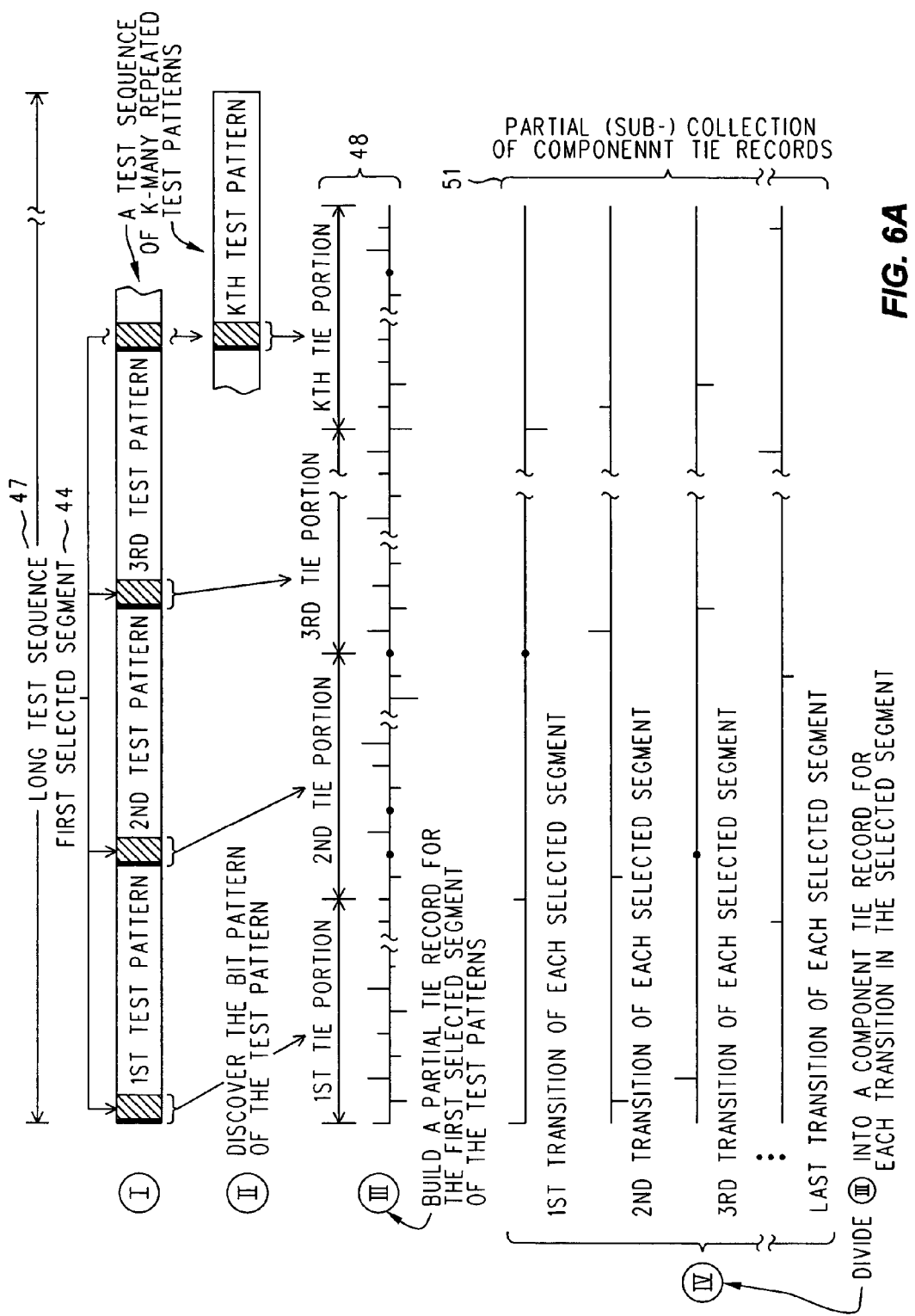
FIGS. 6A-6C are diagrams illustrating the production of partial collections of component TIE Records, each for one different transition in a series of selected segment of the repeated test pattern of a long test sequence.
Figure 6B:
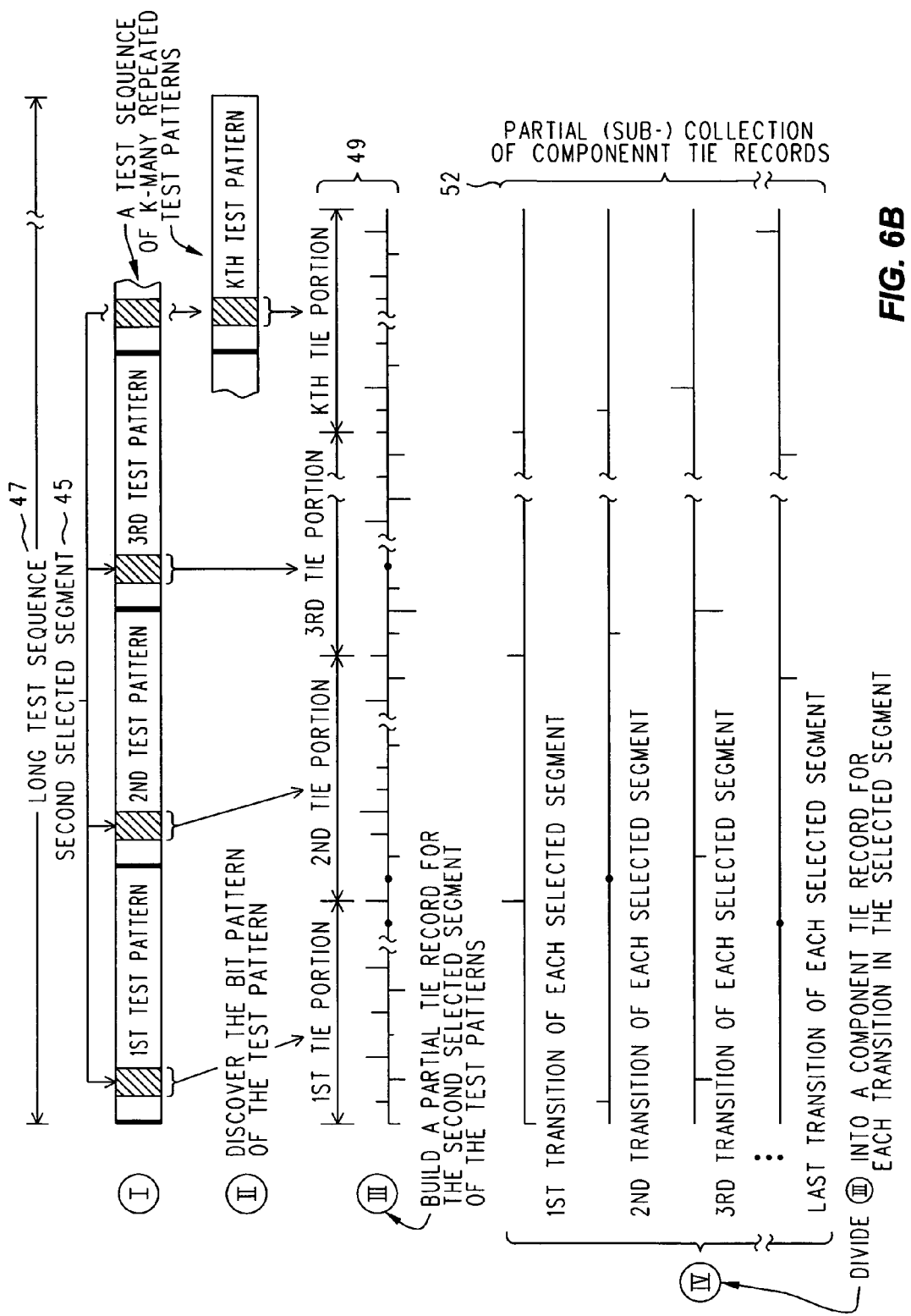
Figure 6C:
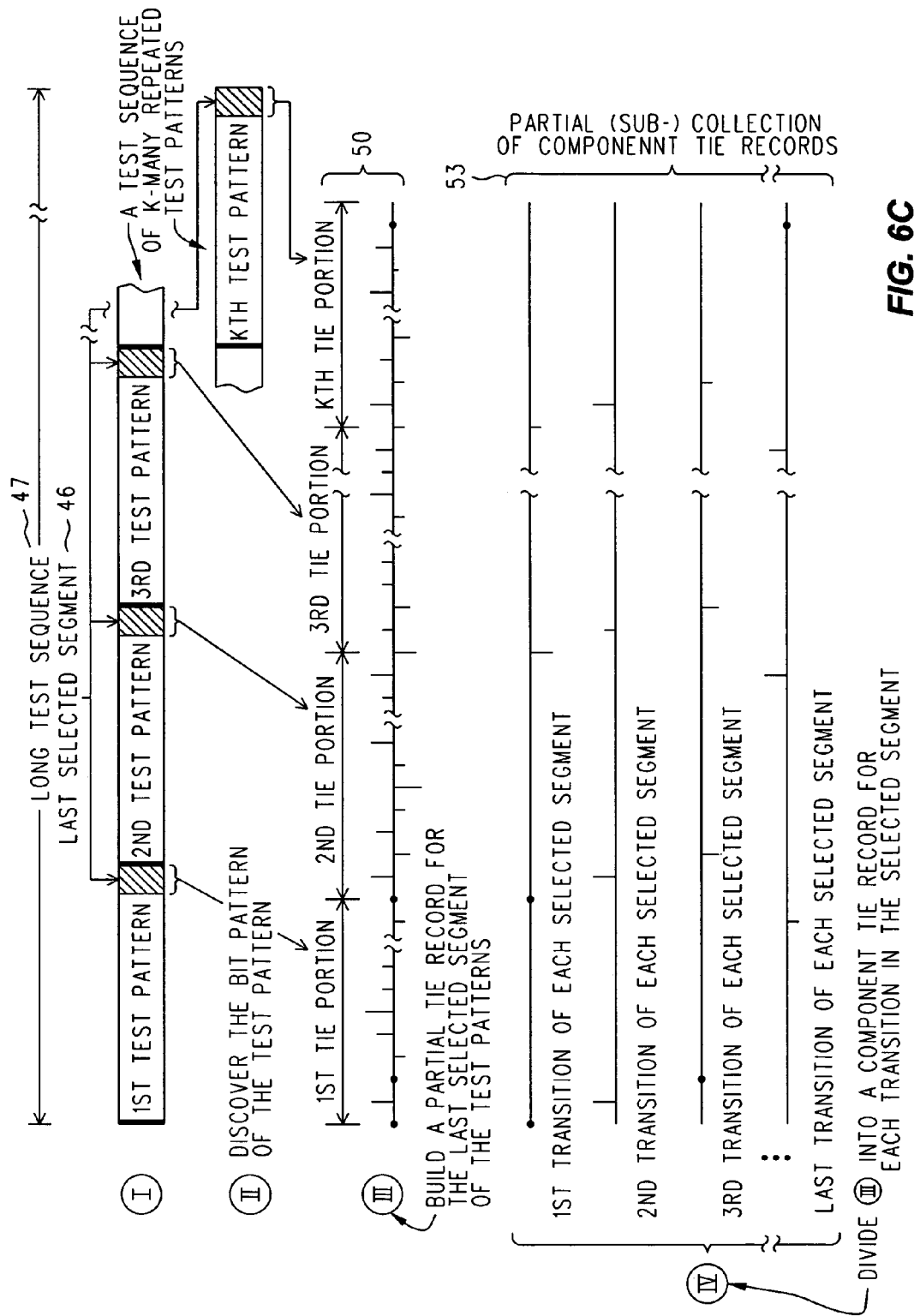

FIGS. 6A-C illustrate this approach. In particular, notice how there are first (44), second (45), . . . , last (46) Selected Segments in the long Test Sequence 47. Observe how their position 'drifts' across the various K-many Test Patterns. The K-many TIE Portions (48-50) in the Partial TIE Records of part III are for just their corresponding respective Selected Segments (44-46). There is a respective corresponding Partial Collection of Component TIE Records (51-53) in part IV for each Partial TIE Record in part III.

Let's consider another application of the jitter measurement mechanisms that we have described. We have so far dealt with timing jitter in edges measured by sampling oscillographic techniques. That is, it has been necessary to reconstruct with DSP techniques the actual trajectory of the waveform from samples that were taken at known times. From that we infer the time of transition, and from collections of those the various jitter parameters. That such inferences are valid is the intellectual underpinning of modern DSOs. But there is another architecture for a digital instrument that measures digital waveforms. It is perhaps not as popular as it once was, but they still exist: the Timing Analyzer (TA). A Timing Analyzer does not digitize a waveform in the usual sense. It characterizes its amplitude as being above or below a threshold that separates the logic values of ONE and ZERO. It can, however, report when along a time axis these transitions occurred, just as a DSO does.

A Timing Analyzers doesn't usually have the robust time axis capability that a high end DSO would have, but it certainly could have. Most TA's look at many channels of input data simultaneously, say enough to characterize an entire bus. They can have very sophisticated threshold detection mechanisms, and if it were desired we could send the TA a Test Sequence and arrange to measure, for each signal in a collection (bus) of signals, a stream of logic values and their times of transitions. That is, for each signal we would have an Acquisition Record reporting logic value/time of transition that could be processed into an associated collection of component TIE Records that are processed for timing jitter as described above. Now we could have simultaneous jitter measurements for the signals belonging to a bus.

Figure 7:
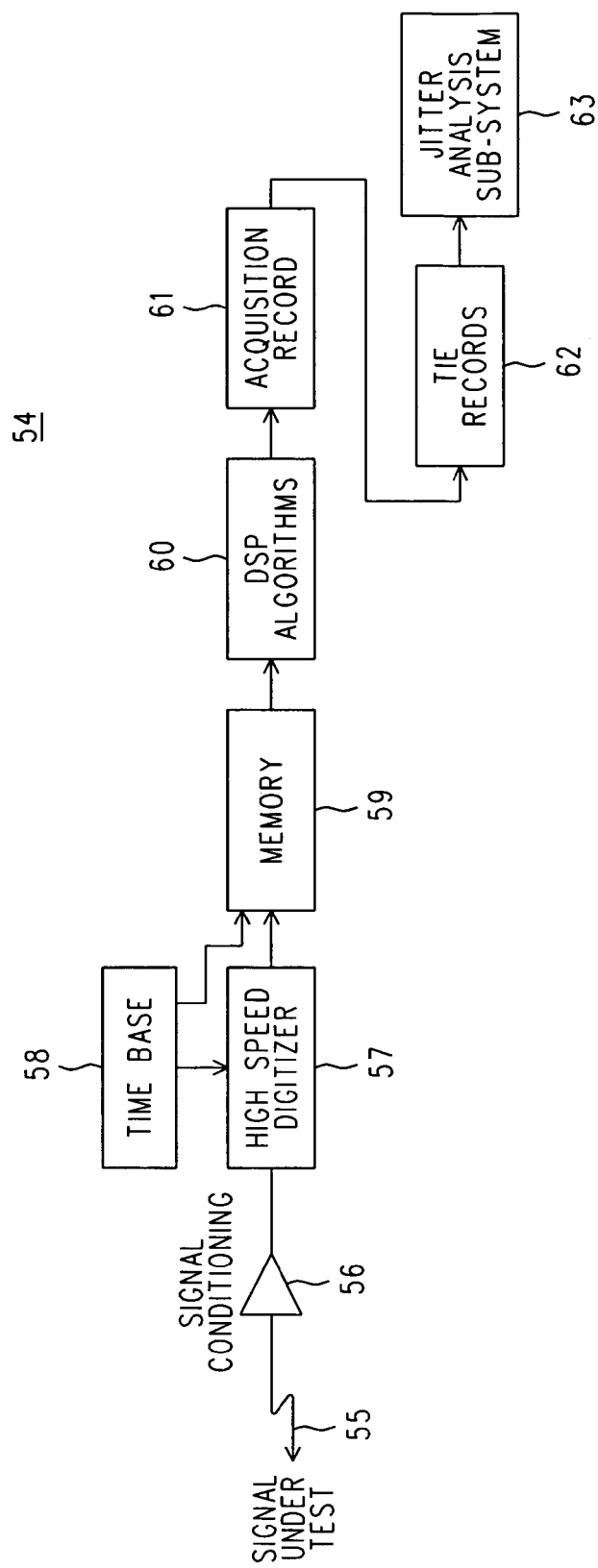
FIG. 7 is a simplified block diagram illustrating a DSO hardware environment within which the invention may be practiced.
Figure 8:
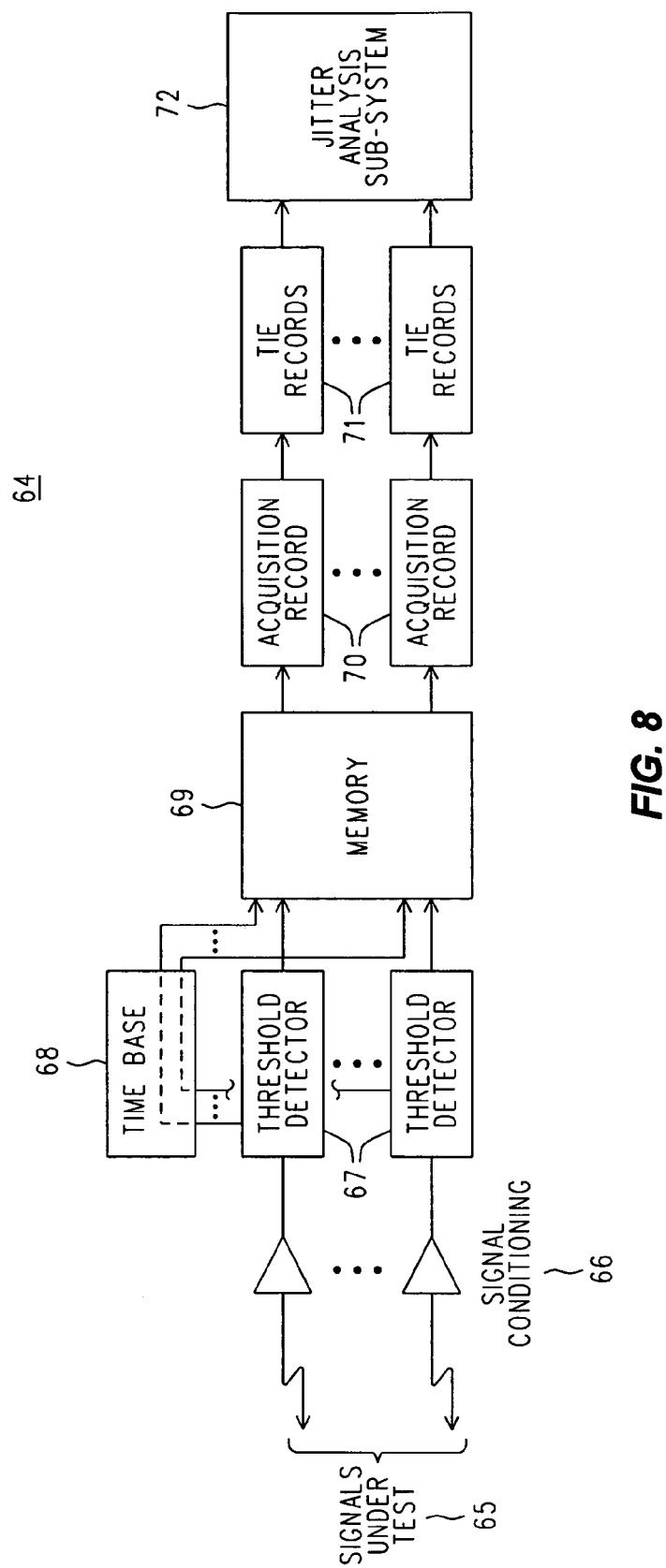
FIG. 8 is a simplified block diagram illustrating a Timing Analyzer hardware environment within which the invention may be practiced.

FIGS. 7 and 8 illustrate the difference between the DSO and TA approaches to jitter analysis. In particular, FIG. 7 is a very simplified block 54 diagram of a DSO that is equipped to perform the type of jitter analysis described herein.

In FIG. 7 a Signal Under Test 55 is probed and after Signal Conditioning (56) is applied to a High Speed Digitizer 57. It performs high speed analog to digital conversion with sufficient resolution (say, ten bits) at a suitable rate. The Digitizer 57 operates in a periodic manner asynchronous with the data and in conjunction with a Time Base 58, such that the samples taken are supplied, along with an indication of when they occurred, as (voltage, time) pairs to a Memory 59. We have suppressed all details connected with the issue of triggering, as what is shown is sufficient to support the notion of acquiring a waveform 1 as in FIG. 1. The acquired waveform that is stored in the memory is processed by the DSP Algorithms 60 to become the Acquisition Records 61, which are also depicted in FIGS. 1 (1) and 4 (26). The Acquisition Records are formed into TIE Records 62, and then processed as described above by a Jitter Analysis Sub-System 63.

FIG. 8 is a very simplified block diagram 64 of a Timing Analyzer that has been adapted to perform the type of jitter analysis described above. In FIG. 8 a collection 65 of Signals Under Test is probed and after Signal Conditioning 66 are applied to a collection of Threshold Detectors 67. Each Threshold detector operates a synchronously and independently to signal when its applied input meets the voltage levels that define the logic values in use. Each Threshold Detector also cooperates with a Time Base 68 so that the occurrence of a transition and its time of occurrence are available as a unit of information that can be stored in a Memory 69. This Memory would likely be an elaborate multiport affair with provisions to correctly handle the simultaneous and near simultaneous occurrence of many such transition/time pairs. This sort of thing is what Timing Analyzers do, and is believed to be conventional. We note that it may be desirable to use a more robust Time Base than is usual, if the jitter analysis is to be comparable to that obtainable with a DSO. In any event, once the transition/time data is stored in the Memory 69, an Acquisition Record 70 can be produced for each channel, along with corresponding TIE Records 71. The Jitter Analysis Sub-System 72 is essentially the same as System 63 of FIG. 7, save that System 72 of FIG. 8 handles more channels of data.

The timing of transitions is not the only parameter in a digital signal that is susceptible to jitter. Let us return to the DSO environment with which we began. If we were to examine a waveform of a digital signal we would discover that a ONE is not always the same steady voltage from one instance to the next, nor is a ZERO always the same voltage. It turns out that they can have the same general paradigm of FIG. 3 applied to them as was done for timing jitter by FIG. 3, only now the ususal term for the variation is voltage noise. So, let us pick a standardized location within a UI to make a voltage measurement, say right in the middle of the UI. Just as we used DSP techniques to reconstruct the actual waveform and infer the actual time of transition when we didn't actually sample there, we can also use DSP techniques to infer the actual voltage at the middle of the UI, even if we didn't actually take a sample at that time. Now we simply use these voltage values in place of what were previously time of transition values, and perform the exact same jitter analysis, beginning with forming the Component (re-sampled) Error Records. In this case, those Component Error Records are Component VLE (Voltage Level Error) Records. There may be some choice as to how to determine what voltage value is correct, or, what any 'error' is relative to. One might specify an exact correct value, a range of satisfactory values, or, a suitable average could be selected as a correct value. We would need such a choice to instantiate the notion of Voltage Level Error to produce a measured quantity (i.e., a voltage error). But as far as the jitter measurements on VLE Records are concerned, it is in every way a substitution of variables; voltage error for time error.

Figure 9:
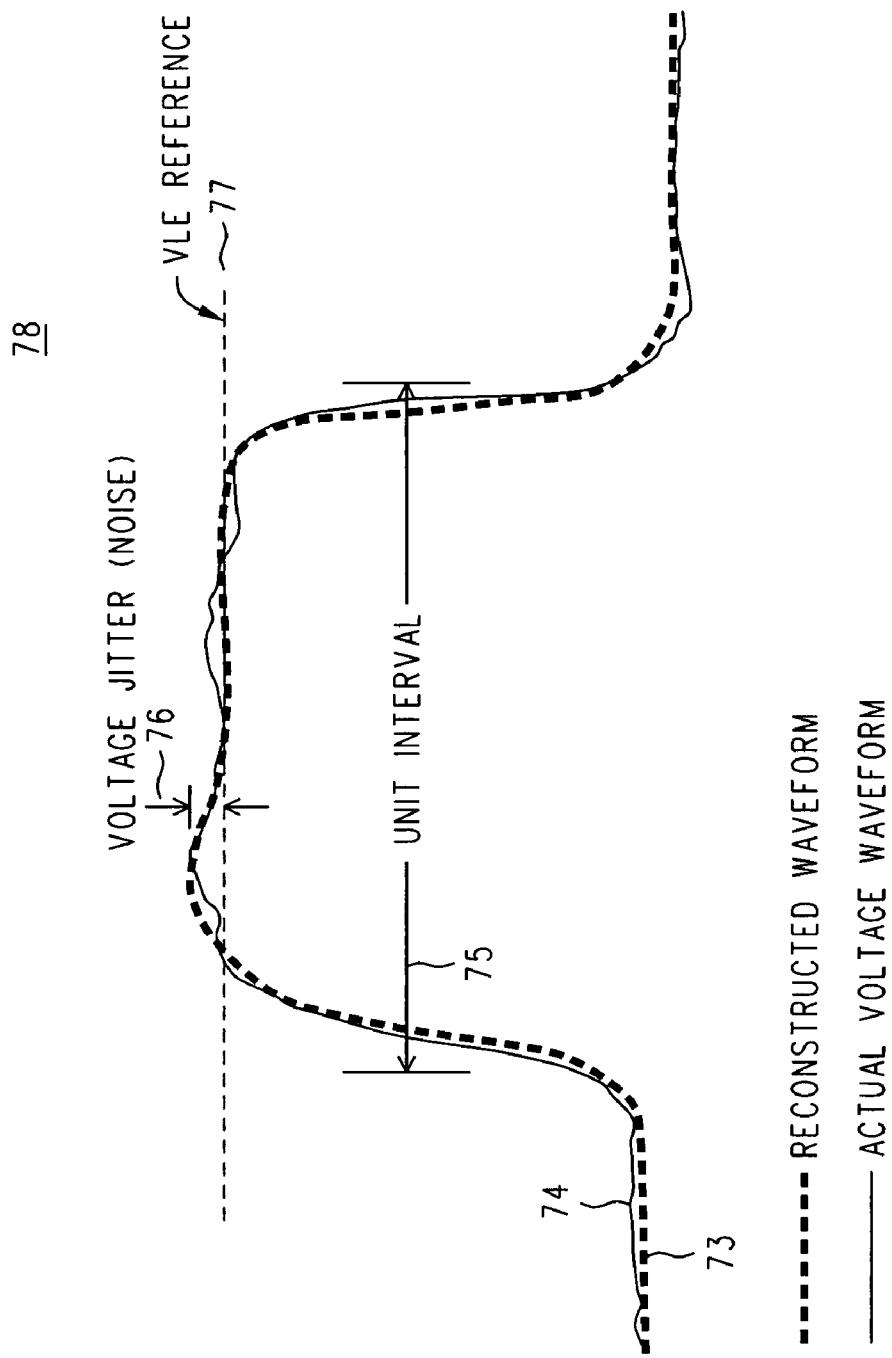
FIG. 9 is a diagram illustrating that the invention may be utilized to analyze voltage jitter.

Thus, we see in FIG. 9 an instance 78 of one unit interval 75 of some actual signal 74 of interest and its reconstruction 73 after sampling. Once a suitable VLE reference 77 has been specified or automatically determined, the reconstructed waveform 73 can be inspected (it is, after all, just a sequence of values in memory) to determine the amount of Voltage Jitter (noise) 76 that is present. From there, VLE Records are produced, and used in place of the TIE Records during a jitter analysis, as described above.

We claim:

1. A method of measuring timing jitter in a digital signal that exhibits a test sequence of digital values including a plurality of repetitions of a test pattern of transitions between digital values, the method comprising the steps of:
   (a) measuring instances of the test pattern in the digital signal to form a collection of corresponding component Time Interval Error Records each referenced to a common time axis, the collection containing a different component Time Interval Error Record for each transition in the test pattern and each component Time Interval Error Record containing time of transition data for the plurality of repetitions of the associated test pattern transition in the test sequence;
   (b) performing a component Fourier Transform on each of the component Time Interval Error Records;
   (c) adjusting each component Fourier Transform by removing a DC component; and
   (d) basing a timing jitter measurement on the adjusted component Fourier Transforms of step (c).

2. A method as in claim 1 wherein basing the timing jitter measurement on the adjust component Fourier Transforms of step (c), comprises:
   combining the adjusted component Fourier Transforms into an equivalent Fourier Transform; and
   basing the timing jitter measurement on the equivalent Fourier Transform.

3. A method of measuring timing jitter in a digital signal that exhibits a test sequence of digital values including a plurality of repetitions of a test pattern of transitions between digital values, the method comprising the steps of:
   (a) measuring instances of the test pattern in the digital signal to form a collection of corresponding component Time Interval Error Records each referenced to a common time axis, the collection containing a different component Time Interval Error Record for each transition in the test pattern and each component Time Interval Error Record containing time of transition data for the plurality of repetitions of the associated test pattern transition in the test sequence;

(b) performing a component Fourier Transform on each of the component Time Interval Error Records;

(c) combining the component Fourier Transforms of step (b) into an equivalent Fourier Transform; and (d) basing a timing jitter spectrum measurement on the equivalent Fourier Transform of step (c).

4. A method of measuring voltage noise in a digital signal that exhibits a test sequence of digital values including a plurality of repetitions of a test pattern of transitions between digital values, the method comprising the steps of:

(a) measuring instances of the test pattern in the digital signal to form a collection of corresponding component Voltage Level Error Records each referenced to a common time axis, the collection containing a different component Voltage Level Error Record for at least one selected location within each Unit Interval in the test pattern and each component Voltage Level Error Record containing logic level voltage data for the plurality of repetitions of the associated test pattern transition in the test sequence;

(b) performing a component Fourier Transform on each of the component Voltage Level Error Records;

(c) basing a voltage noise measurement on the component Fourier Transforms of step (b);

(d) combining the component Fourier Transforms into an equivalent Fourier Transform; and (e) basing a voltage noise measurement on the equivalent Fourier Transform of step (d).

5. A method of measuring timing jitter in a digital signal that exhibits a test sequence of digital values longer than available acquisition memory and including repeated instances of a test pattern of transitions between digital values, the method comprising the steps of:

(a) measuring a selected segment of individual test patterns in the repeated instances thereof to form a corresponding partial collection of component Time Interval Error Records, each of which is referenced to a common time axis, the corresponding partial collection containing a different component Time Interval Error Record for each transition in the selected segment and each component Time Interval Error Record containing time of transition data for the repeated instances of the associated test pattern transition in the selected segment;

(b) performing a component Fourier Transform on each of the component Time Interval Error Records in the partial collection thereof in step (a), including;

applying a windowing function to each of the component Time Interval Error Records and performing one of a Fast Fourier Transform and a Discrete Fourier Transform on the windowed Time Interval Error Records, and applying an inverse of the windowing function to frequency components in the component Fourier transform of each of the component Time Interval Records to remove corresponding DC components thereof; and (c) basing a timing jitter measurement on the component Fourier Transforms produced by step (b).

6. A method of measuring timing jitter in a digital signal that exhibits a test sequence of digital values longer than available acquisition memory and including repeated instances of a test pattern of transitions between digital values, the method comprising the steps of:

(a) measuring a selected segment of individual test patterns in the repeated instances thereof to form a corresponding partial collection of component Time Interval Error Records, each of which is referenced to a common time axis, the corresponding partial collection containing a different component Time Interval Error Record for each transition in the selected segment and each component Time Interval Error Record containing time of transition data for the repeated instances of the associated test pattern transition in the selected segment;

(b) performing a component Fourier Transform on each of the component Time Interval Error Records in the partial collection thereof in step (a), including applying a windowing function to each of the component Time Interval Error Records and performing one of a Fast Fourier Transform and a Discrete Fourier Transform on the windowed Time Interval Error Records; and applying an inverse of the windowing function to frequency components in the component Fourier transform of each of the component Time Interval Records to remove corresponding DC components thereof;

(c) repeating steps (a) and (b) with another selected segment different from any other selected segment; and (d) subsequent to step (c), basing a timing jitter measurement on the component Fourier Transforms produced by a plurality of repetitions of step (b).

7. The method of claim 1, wherein performing a component Fourier Transform comprises applying a windowing function to each of the component Time Interval Error Records and performing one of a Fast Fourier Transform and a Discrete Fourier Transform on the windowed Time Interval Error Records, and wherein removing the DC component includes applying an inverse of the windowing function to frequency components in the component Fourier transform of each of the component Time Interval Records.

8. the method of claim 1, further comprising determining a deterministic data jitter value from the DC components of all of the component Fourier Transforms.

9. The method of claim 2, wherein basing the timing jitter measurement on the equivalent Fourier Transform comprises finding a value for random jitter by removing spectral lines corresponding to periodic jitter from the equivalent Fourier Transform.

10. The method of claim 3, further comprising determining a deterministic data jitter value using DC components of all of the component Fourier Transforms.

11. The method of claim 3, wherein basing the timing jitter measurement on the equivalent Fourier Transform comprises finding a value for random jitter by removing spectral lines corresponding to periodic jitter from the equivalent Fourier Transform.

12. The method of claim 5, wherein basing the timing jitter measurement on the adjusted component Fourier Transforms produced by step (b) comprises:

combining the adjusted component Fourier Transforms into an equivalent Fourier Transform; and finding a value for random jitter by removing spectral lines corresponding to periodic jitter from the equivalent Fourier Transform.

13. The method of claim 5, further comprising determining a deterministic data jitter value using DC components of all of the component Fourier Transforms.

14. The method of claim 6, further comprising determining a deterministic data jitter value using DC components of all of the component Fourier Transforms.

15. The method of claim 6, wherein basing the timing jitter measurement on the adjusted component Fourier Transforms produced by repetitions of step (b) comprises:

combining the adjusted component Fourier Transforms into an equivalent Fourier Transform; and finding a value for random jitter by removing spectral lines corresponding to periodic jitter from the equivalent Fourier Transform.

* * * * *